US007638037B2

United States Patent
Benard et al.

(10) Patent No.: US 7,638,037 B2
(45) Date of Patent: Dec. 29, 2009

(54) PROCESS FOR THE PREPARATION OF A LUBRICANT

(75) Inventors: Gerard Benard, Petit Couronne (FR); Eric Duprey, Petit Couronne (FR); Patrick Moureaux, Petit Couronne (FR); Johannes Anthonius Robert Van Veen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 568 days.

(21) Appl. No.: 10/537,977

(22) PCT Filed: Dec. 5, 2003

(86) PCT No.: PCT/EP03/50946

§ 371 (c)(1), (2), (4) Date: Jun. 9, 2005

(87) PCT Pub. No.: WO2004/053027

PCT Pub. Date: Jun. 24, 2004

(65) Prior Publication Data

US 2006/0065575 A1 Mar. 30, 2006

(30) Foreign Application Priority Data

Dec. 9, 2002 (EP) .................................. 02293035

(51) Int. Cl.
*C10G 45/58* (2006.01)

(52) U.S. Cl. .................. 208/58; 208/108; 208/111.05; 208/120.05; 208/137

(58) Field of Classification Search .................. 208/27, 208/58, 59, 108, 109, 110, 111.01, 111.35, 208/112, 113, 118, 119, 120.01, 120.35, 208/121, 122, 124, 111.05, 120.05, 137
See application file for complete search history.

(56) References Cited

U.S. PATENT DOCUMENTS 5,306,416 A * 4/1994 Le et al. ...................... 208/108

(Continued)

FOREIGN PATENT DOCUMENTS

CN 1330699 1/2002

(Continued)

OTHER PUBLICATIONS

International Search Report dated Apr. 29, 2004.

(Continued)

*Primary Examiner*—Glenn A Caldarola
*Assistant Examiner*—Taiwo Oladapo
(74) *Attorney, Agent, or Firm*—Charles W. Stewart; Leonard P. Miller

(57) ABSTRACT

Process to prepare a lubricant having a dynamic viscosity at −35° C. of below 5000 cP by performing the following steps: a) contacting a feed containing more than 50 wt % wax in the presence of hydrogen with a catalyst comprising a Group VIII metal component supported on a refractory oxide carrier, and b) contacting the effluent of step (a) with a catalyst composition comprising a noble Group VIII metal, a binder and zeolite crystallites of the MTW type to obtain a product having a lower pour point than the effluent of step (b) and having a viscosity index greater than 120, and (c) adding a pour point depressant additive to the base oil as obtained in step (b).

25 Claims, 3 Drawing Sheets

U.S. PATENT DOCUMENTS

| | | | |
|---|---|---|---|
| 5,425,933 A | * | 6/1995 | Nakagawa .................. 423/706 |
| 6,103,674 A | * | 8/2000 | Nalesnik et al. ............. 508/334 |
| 6,231,750 B1 | * | 5/2001 | Kasztelan et al. ...... 208/111.01 |

FOREIGN PATENT DOCUMENTS

| | | |
|---|---|---|
| EP | 0059059 | 9/1982 |
| EP | 0162719 | 11/1985 |
| EP | 0324528 | 7/1989 |
| EP | 0532118 A1 | 3/1993 |
| EP | 0537969 | 4/1993 |
| EP | 0575077 | 12/1993 |
| EP | 0666894 | 8/1995 |
| EP | 0776959 | 6/1997 |
| GB | 1429494 | 3/1976 |
| GB | 1493620 | 11/1977 |
| GB | 2079735 | 1/1982 |
| RU | 2116332 | 7/1998 |
| WO | 96/41849 | 12/1996 |
| WO | 99/41337 | 8/1999 |
| WO | 00/14179 | 3/2000 |
| WO | 00/29511 | 5/2000 |
| WO | WO02070629 | 9/2002 |
| WO | 02/086025 | 10/2002 |
| WO | 02/099014 | 12/2002 |

OTHER PUBLICATIONS

Lubricant Base Oil and Wax Processing, Avilino Sequeira, Jr., Marcel Dekker Inc. NY 1994, Chapter 6 and 7.

Kishan G. Coulier L., de Beeer V.H. J., van Veen J.A.R., Niemantsverdriet J.W., Jrnl of Catalysis 196, pp. 180-189 (2000).

Gallosilicate MTW as described in Y.X. Zhi, A., Tuel, Y. Bentaarit and C. Naccache, Zeolites 12, 138 (1992), Nu-13(5).

K.M. Reddy, I. Moudrakovski and A. Sayari, J. Chem. Soc., Chem. Commun. 1994 1491.

J. Catalysis, 4, 527 (1965); and 6, 278 (1966) and 61, 395 (1980).

Leonard A.J. Ratnasamy, et al., "Electrical Conduction in Organic Solids", The Faraday Society, No. 51, 1971, pp. 98-108.

Verified synthesis of zeolitic materials, published in Micropores and Mesopores Materials, vol. 22, 1998, pp. 644-645.

Toba, M., et al., Jrnl of Materials Chemistry, 1994, (7), pp. 1131-1135.

Von Bremer H., et al., Z. anorg. Allg. Chem. 505, pp. 79-88, 1983.

* cited by examiner

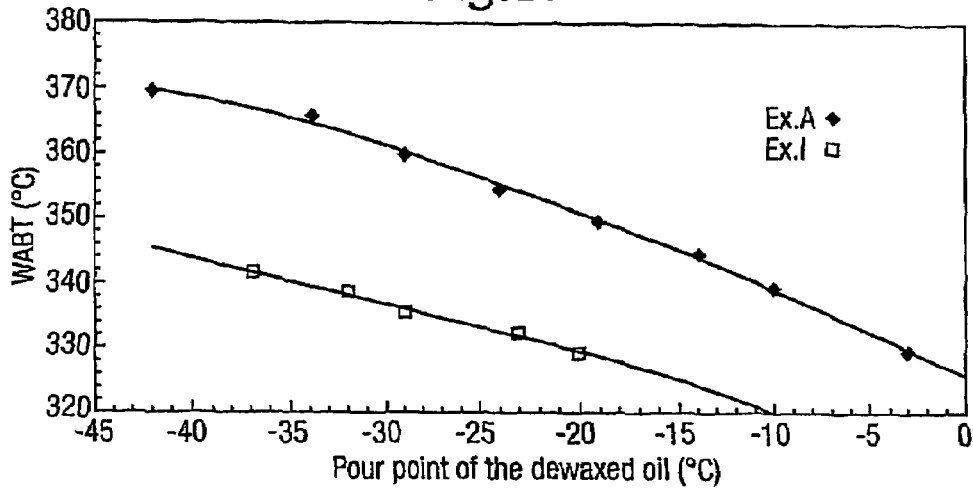
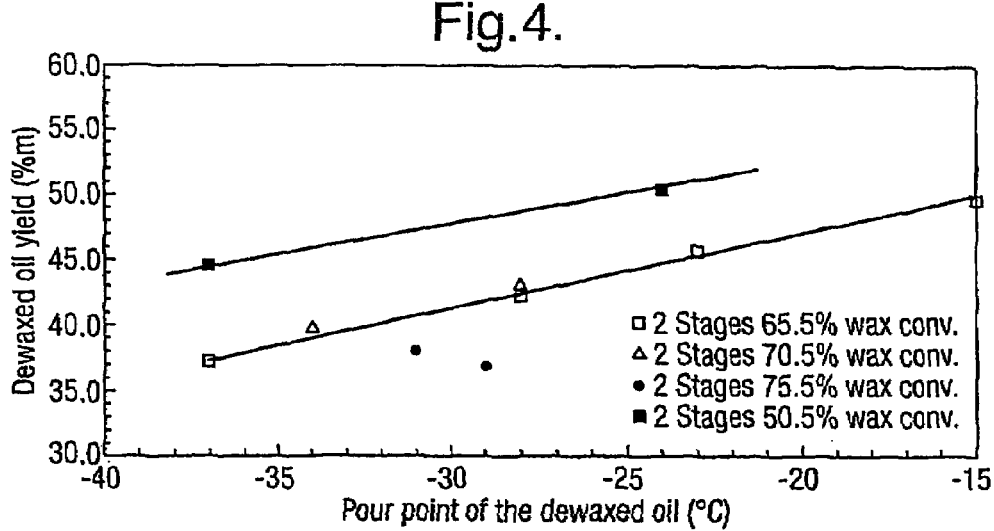

PROCESS FOR THE PREPARATION OF A LUBRICANT

PRIORITY CLAIM

The present application claims priority to European Patent Application No. 02293035.8 filed 9 Dec. 2002.

The invention is directed to a process to prepare a lubricant having a dynamic viscosity at −35° C. of below 5000 cP by the addition of a pour point depressant additive to a base oil obtained by means of a process involving catalytic dewaxing.

In GB-A-1429494 a process for the preparation of a lubricating oil is disclosed wherein the heavy fraction of a hydrocracked slack wax is solvent dewaxed, using a mixture of solvents. The resulting base oil has a very high viscosity index of up to about 155.

The disadvantage of the process is that the response to pour point depressant additives is not sufficient to prepare the desired lubricant.

EP-A-324528 describes a process for the preparation of a lubricating base oil wherein a slack wax is first hydrocracked. The effluent of the hydrocracker is subsequently catalytically dewaxed in the presence of a catalyst containing a zeolite crystallite of the MFI type. The resultant base oil had a viscosity index (VI) of 134 and a pour point of −44° C. The yield of base oil related to the starting slack wax feed is however low.

It is an object of the present invention to provide a process for the preparation of lubricants wherein the prepared base oils have a viscosity index greater than 120 and a favorable response to pour point depressant additives. It is furthermore an object of the present invention to provide a process wherein the yield to base oils is improved starting from a slack wax feed.

This object is achieved with the following process. Process to prepare a lubricant having a dynamic viscosity at −35° C. of below 5000 cP by performing the following steps:

(a) contacting a feed containing more than 50 wt % wax in the presence of hydrogen with a catalyst comprising a Group VIII metal component supported on a refractory oxide carrier, and (b) contacting the effluent of step (a) with a catalyst composition comprising a noble Group VIII metal, a binder and zeolite crystallites of the MTW type to obtain a product having a lower pour point than the effluent of step (b) and having a viscosity index greater than 120, and (c) adding a pour point depressant additive to the base oil as obtained in step (b).

BRIEF DESCRIPTION OF DRAWINGS

FIG. 3 presents a graph that shows WABT as a function of pour point of dewaxed oil.

FIG. 4 presents a graph that shows the influence of wax conversion in a process step on overall base oil yield.

Figure 1:
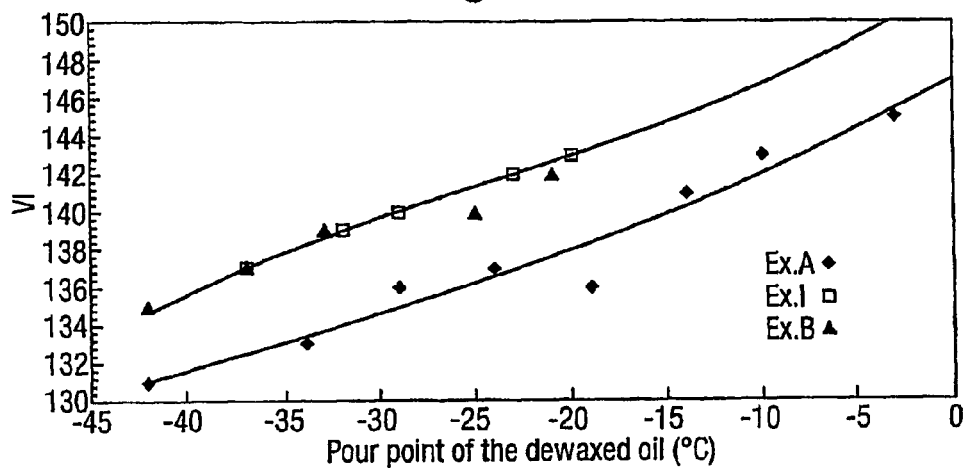
FIG. 1 presents a graph of the viscosity index as a function of achieved pour point of an oil fraction.

Applicants found that when a pour point depressant additive is added to the base oils as prepared by the process according to the present invention a significantly larger reduction in pour point is observed as compared to when the same additive is added to a prior art solvent dewaxed base oil. In addition also the dynamic viscosity as measured at −35° C. according to ASTM D 2983 is significantly more reduced after adding the additive. This is very advantageous. For example high tier lubricants having a dynamic viscosity at −35° C. of below 5000 cP may be prepared with a base oil as prepared according to the present invention having a kinematic viscosity at 100° C. of between 4.5 and 5.5 cSt and a pour point of between −18 and −35° C. and more preferably between −18 and −30° C. and most preferably between −23 and −30° C. The fact that the pour point of the base oil can be relatively high is very advantageous in terms of base oil yield and the viscosity index of the base oil. The viscosity index of the dewaxed base oil having the above pour point range may be advantageously between 135 and 150.

The feed to step (a) may contain between 0-3000 ppm sulphur and between 0-150 ppm nitrogen. The feed may be a synthetic wax, such as for example derived from a Fischer-Tropsch process, or even a slack wax.

Slack wax can be obtained from either a hydrocracked oil or a solvent refined oil. Hydrocracking is preferred because that process can also reduce the nitrogen content to low values. With slack wax derived from solvent refined oils, de-oiling can be used to reduce the nitrogen content. The oil content of the slack wax feed may be between 0 and 50 wt %. Slack wax having a high oil content may be obtained as the direct by-product of a solvent dewaxing process. Examples of suitable solvent dewaxing processes are described in Lubricant Base Oil and Wax Processing, Avilino Sequeira, Jr, Marcel Dekker Inc., New York, 1994, Chapter 7.

The content of aromatic compounds in the waxy feed will suitably be between 3 and 40 wt %. The slack wax feed preferably has a very high viscosity index, more preferably in the range of from 140 to 200. The viscosity index of the feed will determine in part the viscosity index of the resulting lubricating base oil, which are preferably between 120 and 180. The VI will depend on the oil content and the starting material from which the wax has been prepared. Optionally, hydrotreating of the slack wax feed, prior to performing step (a) can be carried out to lower the nitrogen content thereof.

The feed used in the process according to this invention contains more than 50 wt % wax, preferably between 50 and 100 wt % wax and more preferably between 70 and 100 wt % wax.

The wax content as used in the description is measured according to the following procedure. 1 weight part of the to be measured oil fraction is diluted with 4 parts of a (50/50 vol/vol) mixture of methyl ethyl ketone and toluene, which is subsequently cooled to −27° C. in a refrigerator. The mixture is subsequently filtered at −27° C. The wax is removed from the filter and weighed. If reference is made to oil content a wt % value is meant which is 100% minus the wax content in wt %.

Step (a) may be performed using well known hydrocracking processes such as described in Lubricant Base Oil and Wax Processing, Avilino Sequeira, Jr, Marcel Dekker Inc., New York, 1994, Chapter 6 and especially pages 121-131. Catalysts for use in step (a) typically comprise an acidic functionality and a hydrogenation/dehydrogenation functionality. Preferred acidic functionality's are refractory metal oxide carriers. Suitable carrier materials include silica, alumina, silica-alumina, zirconia, titania and mixtures thereof. Preferred carrier materials for inclusion in the catalyst for use in the process of this invention are silica, alumina and silica-alumina.

The catalyst may comprise a Group VIII noble metal, for example palladium and more preferably platinum. Such a catalyst is preferred when the feed to step (a) is substantially free of contaminants such as sulphur, i.e. less than 10 ppm or nitrogen, i.e. less than 10 ppm. Such wax containing feeds may advantageously be obtained from the synthesis product of a Fischer-Tropsch reaction. The catalyst may comprise the noble metal in an amount of from 0.005 to 5 parts by weight, preferably from 0.02 to 2 parts by weight, per 100 parts by weight of carrier material. A particularly preferred catalyst comprises platinum in an amount in the range of from 0.05 to 2 parts by weight, more preferably from 0.1 to 1 parts by weight, per 100 parts by weight of carrier material. Examples of possible noble metal catalysts are C-624 of Criterion Catalyst Company or those described in for example EP-A-666894.

The process according to the invention is particularly suited to process waxy feedstocks which have a mineral oil source, such as for example slack wax. These mineral oil derived feeds will comprise substantial amounts of nitrogen- and sulphur-containing compounds. When such a feed is used the catalyst in step (a) preferably comprises a Group VIB metal and a non-noble Group VIII metal. Possible combinations of one or more of the metals cobalt, iron and nickel, and one or more of the metals chromium, molybdenum and tungsten are preferred. Especially preferred catalysts for use in treating such feeds comprise, in combination, cobalt and molybdenum, nickel and tungsten and nickel and molybdenum. Typically, the catalyst comprises from 10 to 100 parts by weight of the Group VIB metal, if present, preferably from 25 to 80 parts weight, per 100 parts by weight of carrier. The Group VIII non-noble metal is typically present in an amount of from 3 to 100 parts by weight, more preferably from 25 to 80 parts by weight, per 100 parts by weight of carrier. If desired, applying a halogen moiety, in particular fluorine, or a phosphorous moiety to the carrier, may enhance the acidity of the catalyst carrier. Examples of suitable hydrocracking/hydroisomerisation processes and suitable catalysts are described in GB-A-1493620, WO-A-9941337, U.S. Pat. No. 5,370,788, EP-A-537969, U.S. Pat. No. 5,292,989, WO-A-0014179, EP-A-532118, EP-A-666894 and EP-A-776959.

In case of a mineral oil feed to step (a) preferably use is made of a sulphided catalyst based on a Group VIB metal and a non-noble Group VIII metal as described above. Sulphidation of the catalyst may be effected by any of the techniques known in the art, such as ex-situ or in-situ sulphidation. For example, sulphidation may be effected by contacting the catalyst with a sulphur-containing gas, such as a mixture of hydrogen and hydrogen sulphide, a mixture of hydrogen and carbon disulphide or a mixture of hydrogen and a mercaptan, such as butylmercaptan. Alternatively, sulphidation may be carried out by contacting the catalyst with hydrogen and sulphur-containing hydrocarbon oil, such as sulphur-containing kerosene or gas oil. The sulphur may also be introduced into the hydrocarbon oil by the addition of a suitable sulphur-containing compound, for example dimethyldisulphide or tertionylpolysulphide.

The feedstock will preferably comprise a minimum amount of sulphur in order to keep the catalyst in a sulphided state. Preferably at least 200 ppm sulphur and more preferably at least 700 ppm sulphur is present in the feed. It may therefore be necessary to add additional sulphur, for example as dimethylsulphide, or a sulphur containing co-feed to the feed of step (a) if the feed contains a lower level of sulphur. Examples of mineral oil feeds, which contain lower levels of sulphur, are slack waxes obtained from oil, which has been obtained in a hydrocracking process. Such slack waxes may contain between 10-200 ppm sulphur.

A preferred catalyst for use in step (a) is a sulphided hydrodesulphurisation catalyst comprising nickel and tungsten on an acidic amorphous silica-alumina carrier. Such a catalyst is preferably free of any halogen. The sulphided hydrodesulphurisation catalyst has a relatively high hydrodesulphurisation activity. With relatively high activity is here meant a considerably higher activity when compared to state of the art nickel/tungsten containing catalysts based on a silica-alumina carrier. Preferably the hydrodesulphurisation activity of the catalyst is higher than 30% and more preferably below 40%, and most preferably below 35%, wherein the hydrodesulphurisation activity is expressed as the yield in weight percentage of $C_4$-hydrocarbon cracking products when thiophene is contacted with the catalyst under standard hydrodesulphurisation conditions. The standard conditions consists of contacting a hydrogen/thiophene mixture with 200 mg of a 30-80 mesh sulphided catalyst at 1 bar and 350° C., wherein the hydrogen rate is 54 ml/min and the thiophene concentration is 6 vol % in the total gas feed.

Catalyst particles are to be used in the test are first crushed and sieved through a 30-80 mesh sieve. The catalyst is then dried for at least 30 minutes at 300° C. before loading 200 mg of dried catalyst into a glass reactor. Then the catalyst is pre-sulphided by contacting the catalyst for about 2 hours with an $H_2S/H_2$ mixture, wherein the $H_2S$ rate is 8.6 ml/min and the $H_2$ rate is 54 ml/min. The temperature during the pre-sulphiding procedure is raised from room temperature, 20° C., to 270° C. at 10° C./min and held for 30 minutes at 270° C. before raising it to 350° C. at a rate of 10° C./min.

During pre-sulphiding nickel and tungsten oxides are converted to the active metal sulphides. After pre-sulphiding the $H_2S$ flow is stopped and $H_2$ is bubbled at a rate of 54 ml/min through two thermostatted glass vessels containing thiophene. The temperature of the first glass vessel is kept at 25° C. and the temperature of the second glass vessel is kept at 16° C. As the vapour pressure of thiophene at 16° C. is 55 mmHg, the hydrogen gas that enters the glass reactor is saturated with 6 vol % thiophene. The test is performed at 1 bar and at a temperature of 350° C. The gaseous products are analysed by an online gas liquid chromatograph with a flame ionisation detector every 30 minutes for four hours.

In order to obtain a reproducible value for the hydrodesulphurisation activity the test values as obtained by the above method are corrected such to correspond to the hydrodesulphurisation activity of a reference catalyst. The reference catalyst is the commercial C-454 catalyst as obtainable at the date of filing of Criterion Catalyst Company (Houston) and its reference hydrodesulphurisation activity is 22 wt % according to the above test. By testing both the reference catalyst ("test C-454") and the test catalyst ("measured val") one can easily calculate a consistent actual hydrodesulphurisation activity according to the above test with the below equation:

Actual activity="measured val"+((22−"test C-454")/22)*"measured val"

The hydrodesulphurisation activity of the nickel/tungsten catalyst can be improved by using chelating agents in the impregnation stage of the preparation of the catalyst as for example described by Kishan G., Coulier L., de Beer V. H. J., van Veen J. A. R., Niemantsverdriet J. W., Journal of Catalysis 196, 180-189 (2000). Examples of chelating agents are nitrilotriacetic acid, ethylenediaminetetraacetic acid (EDTA) and 1,2-cyclohexanediamine-N,N,N',N',-tetraacetic acid.

The carrier for the catalyst is amorphous silica-alumina. The term "amorphous" indicates a lack of crystal structure, as defined by X-ray diffraction, in the carrier material, although some short range ordering may be present. Amorphous silica-alumina suitable for use in preparing the catalyst carrier is available commercially. Alternatively, the silica-alumina may be prepared by precipitating an alumina and a silica hydrogel and subsequently drying and calcining the resulting material, as is well known in the art. The carrier is an amorphous silica-alumina carrier. The amorphous silica-alumina preferably contains alumina in an amount in the range of from 5 to 75% by weight, more preferably from 10 to 60% by weight as calculated on the carrier alone. A very suitable amorphous silica-alumina product for use in preparing the catalyst carrier comprises 45% by weight silica and 55% by weight alumina and is commercially available (ex. Criterion Catalyst Company, USA).

The total BET surface area of the catalyst is preferably above 100 m$^2$/g and more preferably between 200 and 300 m$^2$/g. The total pore volume is preferably above 0.4 ml/g. The upper pore volume will be determined by the minimum surface area required.

Preferably between 5 and 40 volume percent of the total pore volume is present as pores having a diameter of more than 350 Å. The total pore volume is determined using the Standard Test Method for Determining Pore Volume Distribution of Catalysts by Mercury Intrusion Porosimetry, ASTM D 4284-88.

The amorphous silica-alumina carrier of the catalyst preferably has a certain minimum acidity or, said in other words, a minimum cracking activity. Examples of suitable carriers having the required activity are described in WO-A-9941337. More preferably the catalyst carrier, after having been calcined, at a temperature of suitably between 400 and 1000° C., has a certain minimum n-heptane cracking activity as will be described in more detail below.

The n-heptane cracking is measured by first preparing a standard catalyst consisting of the calcined carrier and 0.4 wt % platinum. Standard catalysts are tested as 40-80 mesh particles, which are dried at 200° C. before loading in the test reactor. The reaction is carried out in a conventional fixed-bed reactor having a length to diameter ratio of 10 to 0.2. The standard catalysts are reduced prior to testing at 400° C. for 2 hrs at a hydrogen flow rate of 2.24 Nml/min and a pressure of 30 bar. The actual test reaction conditions are: n-heptane/H$_2$ molar ratio of 0.25, total pressure 30 bar, and a gas hourly space velocity of 1020 Nml/(g·h). The temperature is varied by decreasing the temperature from 400° C. to 200° C. at 0.22° C./minute. Effluents are analysed by on-line gas chromatography. The temperature at which 40 wt % conversion is achieved is the n-heptane test value. Lower n-heptane test values correlate with more active catalyst.

Preferred carriers have an n-heptane cracking temperature of less than 360° C., more preferably less than 350° C. and most preferably less than 345° C. as measured using the above-described test. The minimum n-heptane cracking temperature is preferably more than 310° C. and more preferably greater than 320° C.

The cracking activity of the silica-alumina carrier can be influenced by, for example, variation of the alumina distribution in the carrier, variation of the percentage of alumina in the carrier, and the type of alumina, as is generally known to one skilled in the art. Reference in this respect is made to the following articles which illustrate the above: Von Bremer H., Jank M., Weber M., Wendlandt K. P., Z. anorg. allg. Chem. 505, 79-88 (1983); Léonard A. J., Ratnasamy P., Declerck F. D., Fripiat J. J., Disc. of the Faraday Soc. 1971, 98-108; and Toba M. et al, J. Mater. Chem., 1994, 4(7), 1131-1135.

The catalyst may also comprise up to 8 wt % of a large pore molecular sieve, preferably an aluminosilicate zeolite. Such zeolites are well known in the art, and include, for example, zeolites such as X, Y, ultrastable Y, dealuminated Y, faujasite, ZSM-12, ZSM-18, L, mordenite, beta, offretite, SSZ-24, SSZ-25, SSZ-26, SSZ-31, SSZ-33, SSZ-35 and SSZ-37, SAPO-5, SAPO-31, SAPO-36, SAPO-40, SAPO-41 and VPI-5. Large pore zeolites are generally identified as those zeolites having 12-ring pore openings. W. M. Meier and D. H. Olson, "ATLAS OF ZEOLITE STRUCTURE TYPES" 3rd Edition, Butterworth-Heinemann, 1992, identify and list examples of suitable zeolites. If a large pore molecular sieve is used then the well-known synthetic zeolite Y as for example described in U.S. Pat. No. 3,130,007 and ultrastable Y zeolite as for example described in U.S. Pat. No. 3,536,605 are suitable molecular sieves. Other suitable molecular sieves are ZSM-12, zeolite beta and mordenite. Such molecular sieve containing catalysts, containing between 0.1 and 8 wt % of the sieve.

The catalyst for use in step (a) may be prepared by any of the suitable catalyst preparation techniques known in the art. A preferred method for the preparation of the carrier comprises mulling a mixture of the amorphous silica-alumina and a suitable liquid, extruding the mixture and drying and calcining the resulting extrudates as for example described in EP-A-666894. The extrudates may have any suitable form known in the art, for example cylindrical, hollow cylindrical, multilobed or twisted multilobed. A most suitable shape for the catalyst particles is cylindrical. Typically, the extrudates have a nominal diameter of from 0.5 to 5 mm, preferably from 1 to 3 mm. After extrusion, the extrudates are dried.

Drying may be effected at an elevated temperature, preferably up to 800° C., more preferably up to 300° C. The period for drying is typically up to 5 hours, preferably from 30 minutes to 3 hours. Preferably, the extrudates are calcined after drying. Calcination is effected at an elevated temperature, preferably between 400 and 1000° C. Calcination of the extrudates is typically effected for a period of up to 5 hours, preferably from 30 minutes to 4 hours. Once the carrier has been prepared, nickel and tungsten may be deposited onto the carrier material. Any of the suitable methods known in the art may be employed, for example ion exchange, competitive ion exchange and impregnation. Preferably nickel and tungsten are added by means of impregnation using a chelating agent as described above. After impregnation, the resulting catalyst is preferably dried and calcined at a temperature of between 200 and 500° C.

Step (a) is conducted at elevated temperature and pressure. Typical operating temperatures for the process are in the range of from 290° C. to 430° C., preferably in the range of from 310° C. to 415° C., more preferably in the range of from 350° C. to 415° C. Typical hydrogen partial pressures are in the range of from 20 to 200 bar, preferably in the range of from 70 to 160 bar. If very high viscosity index, i.e. higher than 135, base oils are desired the pressure is preferably between 90 to 160 bar and more preferably between 100 to 150 bar.

The hydrocarbon feed is typically treated at a weight hourly space velocity in the range of from 0.3 to 1.5 kg/l/h, more preferably in the range of from 0.5 to 1.2 kg/l/h. The feed may be contacted with the catalyst in the presence of pure hydrogen.

Alternatively, it may be more convenient to use a hydrogen-containing gas, typically containing greater than 50% vol hydrogen, more preferably greater than 60% vol hydrogen. A suitable hydrogen-containing gas is gas originating from a catalytic reforming plant.

Hydrogen-rich gases from other hydrotreating operations may also be used. The hydrogen-to-oil ratio is typically in the range of from 300 to 5000 l/kg, preferably from 500 to 2500 l/kg, more preferably 500 to 2000 l/kg, the volume of hydrogen being expressed as standard liters at 1 bar and 0° C.

Step (a) and (b) may be performed in a so-called series flow configuration or in a two stage configuration. The series flow configuration is defined in that the total effluent of step (a) is used as feed to step (b). Thus in this configuration no intermediate separation of gaseous or liquid fractions from the effluent of step (a) takes place between steps (a) and (b). This configuration is advantageous because it enables the process to be carried out in a simple manner, for example in one reactor or two sequentially arranged reactors. This configuration can be advantageously applied for the clean feeds, such as the Fischer-Tropsch derived feed, as discussed above. Applicants have found that this configuration can also be applied for mineral oil feeds suitably containing between 700 and 2000 ppm sulphur using the above described pre-sulphided catalyst in step (a).

Another advantage of this series-flow configuration is that a gas oil and kerosene product can be separated from the effluent of step (b), which have excellent low temperature properties, such as cloud point or freeze point.

In a series flow configuration the pressure in steps (a) and (b) will be about the same for obvious reasons. The pressure will be determined by the desired viscosity index as explained above. Applicants found that to maximize the yield to base oils ex step (b) the wax conversion in step (a) is preferably between 40 and 70% and more preferably between 45 and 60 wt %. The wax conversion is defined as (wax in feed to step (a)–wax in effluent of step (a))/(wax in feed to step (a)) *100%.

In a two-stage configuration part of the gaseous and/or liquid fraction of the effluent of step (a) is separated off before using the effluent as feed to step (b). Preferably at least part of the ammonia and hydrogen sulphide is removed from the effluent of step (a) prior to using said effluent as feed of step (b). Preferably the liquid effluent used as feed of step (b) comprises-after separation less than 1000 ppmw sulphur and less than 50 ppmw nitrogen. Removal of ammonia and hydrogen sulphided may be achieved by well known means, for example high pressure stripping, preferably using hydrogen as stripping gas. More preferably also part or all of the fraction boiling substantially below the base oil product range and the gaseous components are separated by distillation from the effluent of step (a). An advantage of a two-stage configuration is that feeds having a relatively high sulphur content can be used. A further advantage is that the pressure in step (b) can be chosen independently from the pressure in step (a). Normally one will then consider to operate step (b) at a lower pressure. A next advantage is that because part of the compounds boiling below 370° C. can be removed from the effluent of step (a) less feed will have to be dewaxed in step (b), enabling the use of a smaller reactor for step (b). Suitably between 5 and 40 wt % of the feed to step (a) is separated from the effluent of step (a) as a fraction boiling below 370° C.

The catalyst composition of the catalyst used in step (b) comprises a noble Group VIII metal, a binder and a zeolite crystallites of the MTW type. Examples of MTW type zeolites are ZSM-12 as described in U.S. Pat. No. 3,832,449, CZH-5 as described in GB-A-2079735, Gallosilicate MTW as described in Y. X. Zhi, A. Tuel, Y. Bentaarit and C. Naccache, Zeolites 12, 138 (1992), Nu-13(5) as described in EP-A-59059, Theta-3 as described in EP-A-162719, TPZ-12 as described in U.S. Pat. No. 4,557,919 and VS-12 as described in K. M. Reddy, I. Moudrakovski and A. Sayari, J. Chem. Soc., Chem. Commun. 1994, 1491 (1994). The average crystal size of the zeolite is preferably smaller than 0.5 μm and more preferably smaller than 0.1 μm as determined by the well-known X-ray diffraction (XRD) line broadening technique using the high intensity peak at about 20.9 2-theta in the XRD diffraction pattern.

The binder in the catalyst may be any binder usually used for such an application. A possible binder includes alumina or alumina containing binders. Applicants have found that low acidity refractory oxide binder material that is essentially free of alumina provides more improved catalyst. Examples are low acidity refractory oxides such as silica, zirconia, titania, germanium dioxide, boria and mixtures of two or more of these. The most preferred binder is silica. The weight ratio of the molecular sieve and the binder can be anywhere between 5:95 and 95:5. Lower zeolite content, suitable between 5 and 35 wt %, may in some cases be advantageous for achieving an even higher selectivity.

The silica to alumina molar ratio of the zeolite prior to dealumination is preferably larger than 50 and more preferably between 70 and 250 and most preferably between 70 and 150. Preferably the zeolite has been subjected to a dealumination treatment. The dealumination of the zeolite results in a reduction of the number of alumina moieties present in the zeolite and hence in a reduction of the mole percentage of alumina. The expression "alumina moiety" as used in this connection refers to an $Al_2O_3$-unit which is part of the framework of the aluminosilicate zeolite, i.e. which has been incorporated via covalent bindings with other oxide moieties, such as silica ($SiO_2$), in the framework of the zeolite. The mole percentage of alumina present in the aluminosilicate zeolite is defined as the percentage of moles $Al_2O_3$ relative to the total number of moles of oxides constituting the aluminosilicate zeolite (prior to dealumination) or modified molecular sieve (after dealumination). Preferably dealumination is performed such that the reduction in alumina moieties in the framework is between 0.1 and 20%.

Dealumination may be performed by means of steaming. Preferably the surface of the zeolite crystallites are selectively dealuminated. A selective surface dealumination results in a reduction of the number of surface acid sites of the zeolite crystallites, whilst not affecting the internal structure of the zeolite crystallites. When applying a surface dealumination the reduction of alumina moieties in the framework will be lower and preferably between 0.1 and 10%. Dealumination using steam results is a typical non-selective dealumination technique.

Dealumination can be attained by methods known in the art. Particularly useful methods are those, wherein the dealumination selectively occurs, or anyhow is claimed to occur selectively, at the surface of the crystallites of the molecular sieve. Examples of dealumination processes are described in WO-A-9641849. U.S. Pat. No. 5,015,361 describes a method wherein the zeolites are contacted with sterically hindered amine compound.

Preferably dealumination is performed by a process in which the zeolite is contacted with an aqueous solution of a fluorosilicate salt wherein the fluorosilicate salt is represented by the formula:

$$(A)_{2/b}SiF_6$$

wherein 'A' is a metallic or non-metallic cation other than H+ having the valence 'b'. Examples of cations 'b' are alkylammonium, $NH_4+$, $Mg++$, $Li+$, $Na+$, $K+$, $Ba++$, $Cd++$, $Cu+$, $Ca++$, $Cs+$, $Fe++$, $Co++$, $Pb++$, $Mn++$, $Rb+$, $Ag+$, $Sr++$, $Tl+$, and $Zn++$. Preferably 'A' is the ammonium cation. The zeolite material may be contacted with the fluorosilicate salt at a pH of suitably between 3 and 7. Such a dealumination process is for example described in U.S. Pat. No. 5,157,191. The dealumination treatment is also referred to as the AHS-treatment.

The catalyst composition is preferably prepared by first extruding the zeolite with the low acidity binder and subsequently subjecting the extrudate to a dealumination treatment, preferably the AHS treatment as described above. It has been found that an increased mechanical strength of the catalyst extrudate is obtained when prepared according to this sequence of steps.

It is believed that by maintaining the acidity of the catalyst at a low level conversion to products boiling outside the lube boiling range is reduced. Applicants found that the catalyst should have an alpha value below 50 prior to metals addition, preferably below 30, and more preferably below 10. The alpha value is an approximate indication of the catalytic cracking activity of the catalyst compared to a standard catalyst. The alpha test gives the relative rate constant (rate of normal hexane conversion per volume of catalyst per unit time) of the test catalyst relative to the standard catalyst, which is taken as an alpha of 1 (Rate Constant=0.016 sec −1). The alpha test is described in U.S. Pat. No. 3,354,078 and in J. Catalysis, 4, 527 (1965); 6, 278 (1966); and 61, 395 (1980), to which reference is made for a description of the test. The experimental conditions of the test used to determine the alpha values referred to in this specification include a constant temperature of 538° C. and a variable flow rate as described in detail in J. Catalysis, 61, 395 (1980).

The noble metal Group VIII metal used in the catalyst of step (b) is preferably palladium and more preferably platinum. The total amount platinum or palladium will suitably not exceed 10% by weight calculated as element and based on total weight of the catalyst, and preferably is in the range of from 0.1 to 5.0% by weight, more preferably from 0.2 to 3.0% by weight. If both platinum and palladium are present, the weight ratio of platinum to palladium may vary within wide limits, but suitably is in the range of from 0.05 to 10, more suitably 0.1 to 5. Catalysts comprising palladium and/or platinum as the hydrogenation component are preferred. Most preferred is when platinum is used as the sole hydrogenation component. The hydrogenation component is suitably added to the catalyst extrudate comprising the dealuminated aluminosilicate zeolite crystallites by known techniques.

The process conditions used in step (b) are preferably typical catalytic dewaxing process conditions involving operating temperatures in the range of from 200 to 500° C., preferably from 250 to 400° C., more preferably between 300 and 380° C., hydrogen pressures in the range of from 10 to 200 bar preferably from 30 to 150 bar, more preferably from 30 to 60 bar. Weight hourly space velocities (WHSV) in the range of from 0.1 to 10 kg of oil per liter of catalyst per hour (kg/l/hr), preferably from 0.2 to 5 kg/l/hr, more preferably from 0.5 to 3 kg/l/hr and hydrogen to oil ratios in the range of from 100 to 2,000 liters of hydrogen per liter of oil. The base oil having the desired viscosity can be isolated from the effluent of step (b) by normal distillation processes.

The pour point of the intermediate oil product after step (a) including any non-converted wax is suitably above 0° C. and preferably above 10° C. The pour point of the effluent of step (b) is preferably below −10° C., more preferably below −20° C. The VI is higher than 120 and preferably higher than 130 and below 180.

It has been found that the base oil as isolated from the effluent of step (b) has excellent properties with respect to colour and oxidative stability. Thus an additional hydrofinishing step could be omitted.

The invention will be illustrated by the following non-limiting examples.

Preparation of the Dewaxing Catalyst for Step (b)

MTW Type zeolite crystallites were prepared as described in "Verified synthesis of zeolitic materials" as published in Micropores and mesopores materials, volume 22 (1998), pages 644-645 using tetra ethyl ammonium bromide as the template. The Scanning Electron Microscope (SEM) visual observed particle size showed ZSM-12 particles of between 1 and 10 µm. The average crystallite size as determined by XRD line broadening technique as described above was 0.05 µm. The crystallites thus obtained were extruded with a silica binder (10% by weight of zeolite, 90% by weight of silica binder). The extrudates were dried at 120° C. A solution of $(NH_4)_2SiF_6$ (45 ml of 0.019 N solution per gram of zeolite crystallites) was poured onto the extrudates. The mixture was then heated at 100° C. under reflux for 17 h with gentle stirring above the extrudates. After filtration, the extrudates were washed twice with de-ionised water, dried for 2 hours at 120° C. and then calcined for 2 hours at 480° C.

The thus obtained extrudate was impregnated with an aqueous solution of platinum tetramine hydroxide followed by drying (2 hours at 120° C.) and calcining (2 hours at 300° C.). The catalyst was activated by reduction of the platinum under a hydrogen rate of 100 l/hr at a temperature of 350° C. for 2 hours. The resulting catalyst comprised 0.35% by weight Pt supported on the dealuminated, silica-bound MTW zeolite.

EXAMPLE 1

Example 1 illustrates a two-stage configuration as described above.

A slack wax, having a wax content of 82 wt %, a density (d70) of 0.81, a nitrogen content of 30 mg/kg, a sulphur content of 766 mg/kg and a boiling range as listed in Table 1,

TABLE 1

| | |
|---|---|
| Initial boiling point | 353° C. |
| 30 wt % | 487° C. |
| 50 wt % | 510° C. |
| 95 wt % | 588° C. |
| Final boiling point | 670° C. | was contacted with a commercial fluorided C-454 catalyst as obtained from the Criterion Catalyst Company as placed in a fixed bed reactor. The slack wax was fed to the reactor at a weight hourly space velocity (WHSV) of 1 kg/l/h. Hydrogen was fed to the reactor at an inlet pressure of 140 bar and at a flow rate of 1500 Nl/kg of feed. The reaction temperature was 390° C.

The hydrocarbon product was distilled to remove a fraction boiling below 370° C. including a gaseous fraction containing hydrogen sulphide and ammonia to obtain an intermediate product having the properties as listed in Table 2.

TABLE 2

| | |
|---|---|
| Density | 0.787 |
| Wax content | 16 wt % |
| Kinematic viscosity at 100° C. (cSt) | 5.037 |
| Initial boiling point | 366° C. |
| 30 wt % | 426° C. |
| 50 wt % | 451° C. |
| 95 wt % | 539° C. |
| Final boiling point | 611° C. |

The above obtained intermediate product of Table 2 was contacted in the presence of hydrogen with the above-described MTW zeolite containing catalyst at an outlet pressure of 138 bar, a WHSV of 1.0 kg/l.hr and a hydrogen gas rate of 700 Nl/kg feed at various temperatures ranging between 320 and 345° C. The temperature was varied in order to make different qualities of base oil. With different qualities of base oils is here meant base oils having different pour points. The lowest pour point base oils were obtained at the highest temperature.

Gaseous components were separated from the effluent by vacuum flashing at a cutting temperature of 390° C. The oil yield and viscosity index as a function of the achieved pour point of the oil fraction (390° C.+ fraction) is given in FIGS. 1 and 2. In FIG. 3 the required reactor temperature is given as a function of the resultant pour point of the base oil.

Comparative Experiment A

Example 1 was repeated except that the intermediate product of Table 2 was contacted with a catalyst based on a MFI type zeolite (ZSM-5). The catalyst was obtained using the same method as for the catalyst used in Example 1.

Figure 2:
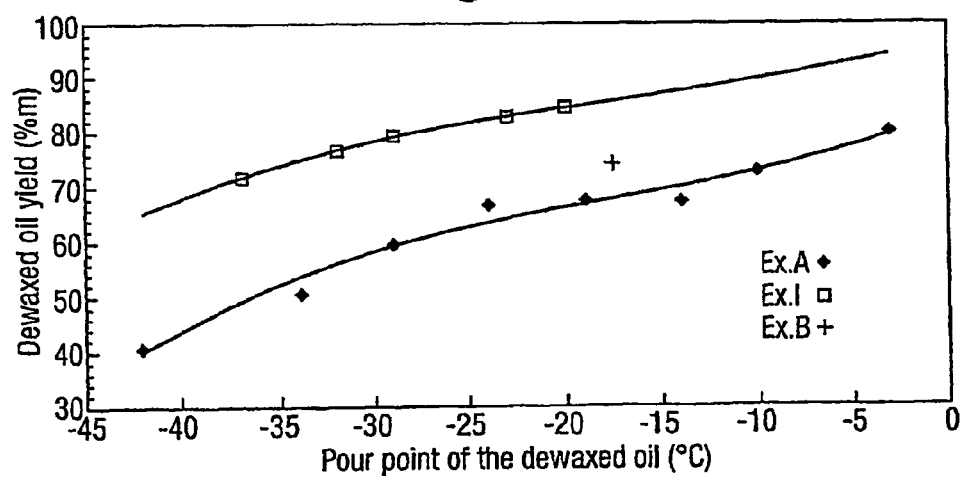
FIG. 2 presents a graph of the oil yield as a function of achieved pour point of an oil fraction.

The oil yield and viscosity index as a function of the achieved pour point of the oil fraction (390° C.+ fraction) is given in FIGS. 1 and 2. In FIG. 3 the required reactor temperature is given as a function of the resultant pour point of the base oil.

Comparative Experiment B

Example 1 was repeated except that the intermediate product of Table 2 was solvent dewaxed to base oils having pour points ranging from −37° C. to −21° C. 1 weight part of the intermediate product was diluted with 4 parts of a (50/50 vol/vol) mixture of methyl ethyl ketone and toluene. This mixture was cooled to a value relating to the desired pour point in a refrigerator. The mixture was subsequently filtered at the same low temperature and the wax was removed from the filter. The viscosity index of the oil and the dewaxed oil yield was measured. The oil yield and viscosity index as a function of the achieved pour point of the oil fraction (390° C.+ fraction) is given in FIGS. 1 and 2.

FIGS. 1 and 2 show that with the MTW containing catalyst base oils can be obtained having in a higher yield as compared to when a ZSM-5 dewaxing catalyst is used or solvent dewaxing is used. Furthermore higher viscosity index values are obtained for the same base oil quality (same pour point) when the process according to the invention is used. FIG. 3 further shows that the catalyst according to the invention can be operated at lower temperatures to achieve the same pour point reduction. Thus the MTW containing catalyst is more active. An additional advantage is that at these lower temperatures more saturation of poly-aromatic compounds will take place. Therefore an additional hydrofinishing step may be omitted when the process of this invention is used.

EXAMPLE 2

Example 2 illustrates the above described series flow configuration wherein use is made of one of the more preferred catalysts for step (a): An LH-21 catalyst as obtained from Criterion Catalyst Company (Houston) was loaded into a step (a) reactor and retained as a fixed bed. The LH-21 catalyst comprises nickel and tungsten on an acid amorphous silica-alumina carrier and has a hydrodesulphurisation activity of 32%. The carrier of this catalyst had a heptane cracking test value of between 320 and 345° C.

A slack wax, having a wax content of 65 wt %, a density (d70) of 0.804, a nitrogen content of 2 mg/kg, a sulphur content of 10 mg/kg was spiked with dimethyldisulphide such that the total content of sulphur in the feed was 2000 ppm. The slack wax had a boiling range as listed in Table 3.

TABLE 3

| | |
|---|---|
| Initial boiling point | 347° C. |
| 30 wt % | 468° C. |
| 50 wt % | 491° C. |
| 95 wt % | 561° C. |
| Final boiling point | 596° C. |

The slack wax was fed to the step (a) reactor at a weight hourly space velocity of 1 kg/l/h. Hydrogen was fed to the reactor at an inlet pressure of 145 bar and at a hydrogen flow rate of 1500 Nl/kg of feed. The reaction temperature was varied between 350 and 365° C. such to achieve a desired wax conversion as defined above.

The effluent as obtained in the step (a) reactor was as such fed to a step (b) reactor. The conditions with respect to pressure, space velocity and hydrogen flow rate were as in the step (a) reactor. The reaction temperature was varied between 325 and 345° C. such to achieve a desired pour point of the resultant base oils.

The base oils were obtained by cutting the effluent of the step (b) reactor at a temperature of 390° C. The yield to base oils were expressed as the fraction thus obtained relative to the feed to step (a). A relatively large fraction of kerosene and gas oil having good cold flow properties were also obtained.

FIG. 4 shows the influence of the wax conversion in step (a) on the overall base oil yield. The Figure shows that at 50 wt % wax conversion the base oil yield is higher than at higher wax conversions in step (a).

EXAMPLE 3

The intermediate product of Table 2 was catalytically and solvent dewaxed to various pour points between −20 and −37° C. using the procedures of Example 1 and Experiment B respectively. The dynamic viscosity at −35° C. was measured according to ASTM D 2983.

Figure 5:
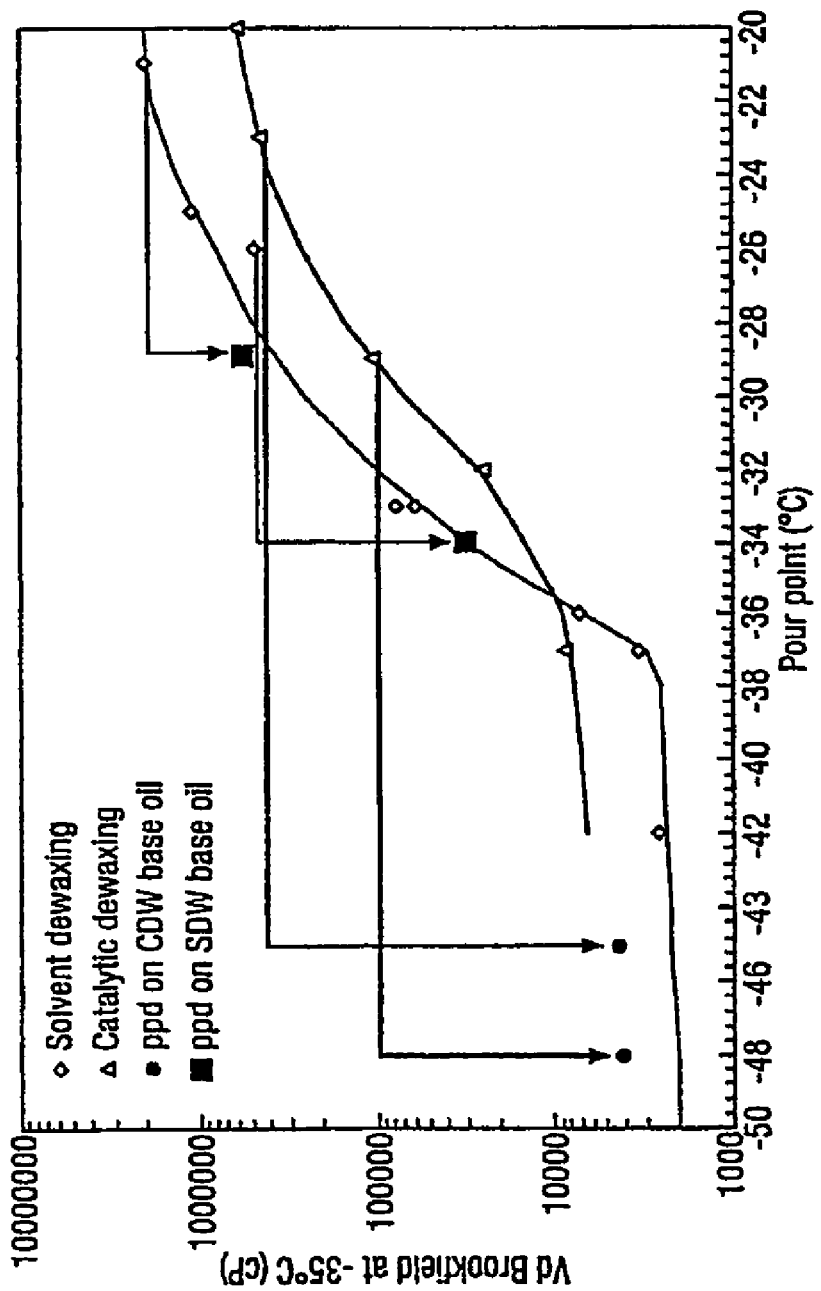
FIG. 5 presents a graph of the dynamic viscosity at −35° C. of an intermediate product that was catalytically and solvent dewaxed at various pour points between −20 and −37° C.

The results are presented in FIG. 5. To four selected samples (see FIG. 5) 0.15 wt % of an additive Plexol 154E as obtained from Rhom and Haas company was added.

In FIG. 5 CDW relates to the catalytically dewaxed base oils, SDW relates to the solvent dewaxed base oils and the 'ppd' relates to the respective base oils containing the additive. The corresponding base oils with and without the additive are linked with an arrow.

From FIG. 5 it can be seen that both pour point and dynamic viscosity of the catalytic dewaxed base oils according to the present invention were reduced much more as compared to the solvent dewaxed base oils consisting the additive.

That which is claimed is:

1. A process to prepare a lubricant having a dynamic viscosity at −35° C. of below 5000 cP by performing the following steps:
   (a) hydrocracking a feed containing more than 50 wt % wax by contacting said feed in the presence of hydrogen with a catalyst comprising a Group VIII metal component supported on a refractory oxide carrier under hydrocracking conditions sufficient to achieve between 40 and 70 wt % wax conversion; and
   (b) catalytically dewaxing at least part of the effluent of step (a) with a catalyst composition comprising a noble Group VIII metal, a binder and zeolite crystallites of the MTW type to obtain a base oil product in high yield having a pour point below −10° C. and having a viscosity index greater than 120; and (c) adding a pour point depressant additive to the base oil product obtained in step (b) thereby obtaining a lubricant having a dynamic viscosity at 35° C. of below 5000 cP.

2. The process according to claim 1, wherein the base oil product in step (b) has a pour point below −20° C. and a viscosity index greater than 130 and below 180.

3. The process according to claim 2, wherein the noble Group VIII metal in step (b) is platinum and the binder in step (b) is a low acidity binder which binder is essentially free of alumina.

4. The process according to claim 3, wherein the binder is silica.

5. The process according to claim 4, wherein the zeolite crystallites have been subjected to a selective surface dealumination process.

6. The process according to claim 5, wherein the selective surface dealumination process comprises contacting the zeolite crystallites with an aqueous solution of a fluorosilicate salt wherein the fluorosilicate salt is represented by the formula:

$$(A')_{2/b}SiF_6$$

wherein A' is a metallic or non-metallic cation other than H+ having the valence 'b'.

7. The process according to claim 6, wherein the wax containing feed is derived from a Fischer-Tropsch process, the Group VIII metal in step (a) is platinum and/or palladium and wherein the total effluent of step (a) is used as feed to step (b) in a series flow configuration.

8. The process according to claim 1, wherein the feed to step (a) comprises at least 700 ppm sulfur, the catalyst used in step (a) is a pre-sulphided catalyst comprising a Group VIB metal and a non-noble Group VIII metal and wherein the total effluent of step (a) is used as feed to step (b) in a series flow configuration.

9. The process according to claim 8, wherein the wax conversion in step (a) is between 40 and 60%.

10. The process according to claim 1, wherein the feed to step (a) comprises between 700 and 2000 ppm sulfur, the catalyst used in step (a) is a pre-sulphided catalyst comprising a Group VIB metal and a non-noble Group VIII metal and wherein at least part of the ammonia and hydrogen sulphide which is present in the effluent of step (a) is separated from said effluent prior to using said effluent as feed of step (b).

11. The process according to claim 10, wherein the pressure in step (a) is between 100 to 150 bar and the pressure in step (b) is between 30 and 60 bar.

12. The process according to claim 11, wherein the catalyst used in step (a) is a pre-sulphided hydrodesulphurisation catalyst comprising nickel and tungsten on an acid amorphous silica-alumina carrier.

13. The process according to claim 12, wherein the sulphided hydrodesulphurisation catalyst has a hydrodesulphurisation activity of higher than 30%, wherein the hydrodesulphurisation activity is expressed as the yield in weight percentage of $C_4$-hydrocarbon cracking products when thiophene is contacted with the catalyst under standard hydrodesulphurisation conditions, wherein the standard conditions consist of contacting a hydrogen-thiophene mixture with 200 mg of a 30-80 mesh catalyst at 1 bar and 350° C., wherein the hydrogen rate is 54 ml/mm and the thiophene concentration is 6 vol % in the mixture.

14. The process according to claim 13, wherein the hydrodesulphurisation activity of the catalyst is lower than 40%.

15. The process according to claim 14, wherein the hydrodesulphurisation catalyst is obtained in a process wherein nickel and tungsten are impregnated on the acid amorphous silica-alumina carrier in the presence of a chelating agent.

16. The process according to claim 15, wherein the alumina content of the hydrodesulphurisation catalyst is between 10 and 60 wt % as calculated on the carrier alone.

17. The process according to claim 16, wherein the silica-alumina carrier has an n-heptane cracking test value of between 310 and 360° C., wherein the cracking test value is obtained by measuring the temperature at which 40 wt % of n-heptane is converted when contacted, under standard test conditions, with a catalyst consisting of said carrier and 0.4 wt % platinum.

18. The process according to claim 17, wherein the silica-alumina carrier has an n-heptane cracking test value of between 320 and 350° C.

19. The process according to claim 18, wherein the catalyst comprises between 2-10 wt % nickel and between 5-30 wt % tungsten.

20. The process according to claim 19, wherein the surface area of the hydrodesulphurisation catalyst is between 200 and 300 $m^2/g$.

21. The process according to claim 20, wherein the total pore volume of the hydrodesulphurisation catalyst is above 0.4 ml/g.

22. The process according to claim 8, wherein the wax conversion in step (a) is between 45 and 60%.

23. The process according to claim 8, wherein gas oil and kerosene product having excellent low temperature properties is separated from the effluent of step (b).

24. The process according to claim 1, wherein a fraction boiling below 370° C. is removed from the effluent of step (a) prior to being contacted with the MTW type zeolite-containing catalyst composition in step (b).

25. The process according to claim 24, wherein said fraction removed from the effluent of step (a) is between 5 and 40 wt % of the feed to step (a).

* * * * *